(12) United States Patent
Lee (10) Patent No.: US 11,332,121 B2
(45) Date of Patent: May 17, 2022

(54) AUTONOMOUS PARKING APPARATUS AND METHOD IN MECHANICAL PARKING SYSTEM

(71) Applicants: HYUNDAI MOTOR COMPANY, Seoul (KR); KIA MOTORS CORPORATION, Seoul (KR)

(72) Inventor: Jae Hong Lee, Siheung-si (KR)

(73) Assignees: HYUNDAI MOTOR COMPANY, Seoul (KR); KIA MOTORS CORPORATION, Seoul (KR)

(*) Notice: Subject to any disclaimer, the term of this patent is extended or adjusted under 35 U.S.C. 154(b) by 190 days.

(21) Appl. No.: 16/276,981

(22) Filed: Feb. 15, 2019

(65) Prior Publication Data

US 2020/0114904 A1 Apr. 16, 2020

(30) Foreign Application Priority Data

Oct. 16, 2018 (KR) .................. 10-2018-0123365

(51) Int. Cl.
*B60W 30/06* (2006.01)
*G05D 1/00* (2006.01)
*G05D 1/02* (2020.01)
*G01S 17/86* (2020.01)
*G01S 17/931* (2020.01)

(52) U.S. Cl.
CPC ............. *B60W 30/06* (2013.01); *G01S 17/86* (2020.01); *G01S 17/931* (2020.01); *G05D 1/0088* (2013.01); *G05D 1/0231* (2013.01); *G05D 1/0255* (2013.01); *B60W 2420/52* (2013.01); *B60W 2420/54* (2013.01)

(58) Field of Classification Search
CPC ............. B60W 30/06; B60W 2420/52; B60W 2420/54; G01S 17/931; G01S 17/86; G05D 1/0088; G05D 1/0231; G05D 1/0255
See application file for complete search history.

(56) References Cited

U.S. PATENT DOCUMENTS

| 8,560,169 | B2 | 10/2013 | Sasajima et al. |
| 9,557,741 | B1* | 1/2017 | Elie ..................... G05D 1/0088 |
| 10,167,016 | B2 | 1/2019 | Pla Rubio et al. |
| 10,351,060 | B2 | 7/2019 | Ha et al. |
| 2011/0102197 | A1 | 5/2011 | Herwich |
| 2015/0138358 | A1 | 5/2015 | Seo et al. |
| 2017/0329342 | A1* | 11/2017 | Kazama ............... G05D 1/0011 |

(Continued)

FOREIGN PATENT DOCUMENTS

| CN | 102303604 A | 1/2012 |
| CN | 102407848 A | 4/2012 |

(Continued)

OTHER PUBLICATIONS

Chinese Office Action dated Jul. 20, 2021 from the corresponding Chinese Application No. 2019101876913, 20 pp.

*Primary Examiner* — Rachid Bendidi
(74) *Attorney, Agent, or Firm* — Lempia Summerfield Katz LLC (57) ABSTRACT

An autonomous parking apparatus includes: a detector that detects a space around a vehicle, and a processor that performs autonomous parking by generating local map data based on spatial information obtained through the detector and detecting an available parking space based on the local map data.

13 Claims, 6 Drawing Sheets

(56) References Cited

U.S. PATENT DOCUMENTS

| | | | |
|---|---|---|---|
| 2017/0355307 | A1 | 12/2017 | Ha et al. |
| 2018/0009477 | A1 | 1/2018 | Pla Rubio et al. |
| 2018/0120851 | A1* | 5/2018 | Shin ................. G01S 17/931 |
| 2018/0354502 | A1* | 12/2018 | Yaldo ................. H04W 4/46 |

FOREIGN PATENT DOCUMENTS

| | | |
|---|---|---|
| CN | 103112453 A | 5/2013 |
| CN | 104260722 A | 1/2015 |
| CN | 104656084 A | 5/2015 |
| CN | 107499307 A | 12/2017 |
| CN | 107585159 A | 1/2018 |
| CN | 108016497 A | 5/2018 |
| DE | 10 2013 213 064 A1 | 1/2015 |
| DE | 10 2014 221 751 A1 | 4/2016 |
| EP | 2 234 085 A1 | 9/2010 |

\* cited by examiner

AUTONOMOUS PARKING APPARATUS AND METHOD IN MECHANICAL PARKING SYSTEM

CROSS-REFERENCE TO RELATED APPLICATION

This application claims priority to and the benefit of Korean Patent Application No. 10-2018-0123365, filed on Oct. 16, 2018, the entire contents of which are incorporated herein by reference.

FIELD

The present disclosure relates to an autonomous parking apparatus and a method for performing parking by recognizing an available parking space.

BACKGROUND

The statements in this section merely provide background information related to the present disclosure and may not constitute prior art.

Parking has emerged as a major issue with the frequent use of vehicles. Mechanical parking systems have recently made an appearance to solve the parking issue. The mechanical parking systems refer to parking equipment installed on off-street parking lots and auxiliary parking lots to move vehicles to parking places using mechanical apparatuses.

Since the mechanical parking systems can park a number of vehicles in a narrow space, the mechanical parking systems help to solve the parking issue and facilitate anti-theft. However, injuries increase due to mechanical defects in the mechanical parking systems and mistakes of managers and users.

SUMMARY

The present disclosure has been made to solve the above-mentioned problems occurring in the prior art while advantages achieved by the prior art are maintained intact.

An aspect of the present disclosure provides an autonomous parking apparatus and a method for performing parking by generating a local map using information on a space around a vehicle that is obtained through a sensor mounted on the vehicle and detecting an available parking space that the vehicle is able to enter, based on the generated local map.

The technical problems to be solved by the present inventive concept are not limited to the aforementioned problems, and any other technical problems not mentioned herein will be clearly understood from the following description by those skilled in the art to which the present disclosure pertains.

According to an aspect of the present disclosure, an autonomous parking apparatus includes: a detector that detects a space around a vehicle and a processor that performs autonomous parking by generating local map data based on spatial information obtained through the detector and determining an available parking space based on the local map data.

The detector may include a light detection and ranging (LiDAR) sensor that detects boundary information of the space on a point-by-point basis.

The processor may cluster the point-based boundary information detected through the LiDAR sensor into line-based boundary information to generate the local map data.

The processor may group boundary points on the same line, among boundary points of the space, to generate boundary lines.

The processor may extract break points, at each of which two boundary lines forming a predetermined angle intersect each other, from the local map data and may extract a first break point and a second break point, among the extracted break points, which are connected by a line segment and at which boundary lines are connected straight to opposite ends of the line segment, respectively.

The processor may extract a space bounded by the line segment, which connects the first break point and the second break point, from the local map data.

The processor may calculate a distance between the first break point and the second break point to recognize a width of the available parking space.

The processor may calculate a distance between the line segment connecting the first break point and the second break point and a boundary line parallel to the line segment to recognize a depth of the available parking space.

The processor may determine whether the vehicle is able to be parked in the available parking space, based on the width and the depth of the available parking space.

The detector may further include at least one of an ultrasonic sensor and a radar sensor.

According to another aspect of the present disclosure, an autonomous parking method includes: a step of detecting, by a detector, a space around a vehicle; a step of generating local map data, by a processor, based on the detected space around the vehicle; a step of determining, by the processor, an available parking space based on the local map data; and a step of performing autonomous parking of the vehicle in the available parking space.

The step of generating the local map data may include a step of detecting point-based boundary information on the space around the vehicle using a LiDAR sensor and a step of generating the local map data by clustering the point-based boundary information into line-based boundary information.

The step of detecting the available parking space may include a step of extracting break points, at each of which two boundary lines forming a predetermined angle intersect each other, from the local map data, a step of extracting a first break point and a second break point, among the extracted break points, which are connected by a line segment and at which boundary lines are connected straight to opposite ends of the line segment, respectively, a step of recognizing a width and a depth of the available parking space, based on the first break point and the second break point, a step of determining whether the vehicle is able to enter the available parking space, based on the width and the depth of the available parking space, and a step of setting the available parking space as a destination, based on a result obtained by determining whether the vehicle is able to enter the available parking space.

The step of recognizing the width and the depth of the available parking space may include a step of calculating a distance between the first break point and the second break point to recognize the width of the available parking space and a step of calculating a distance between the line segment connecting the first break point and the second break point and a boundary line parallel to the line segment to recognize the depth of the available parking space.

The step of performing the autonomous parking may include a step of generating a path for parking the vehicle in the available parking space, based on the local map data and a step of maneuvering the vehicle into the available parking space along the generated path.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Furthermore, in describing exemplary forms of the present disclosure, detailed descriptions related to well-known functions or configurations will be omitted when they may make subject matters of the present disclosure unnecessarily obscure.

Terms, such as "first", "second", "A", "B", "(a)", "(b)", and the like, may be used herein to describe elements of the present disclosure. Such terms are only used to distinguish one element from another element, and the substance, sequence, order, or number of these elements is not limited by these tams. Unless otherwise defined, all terms used herein, including technical and scientific terms, have the same meaning as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

Figure 1:
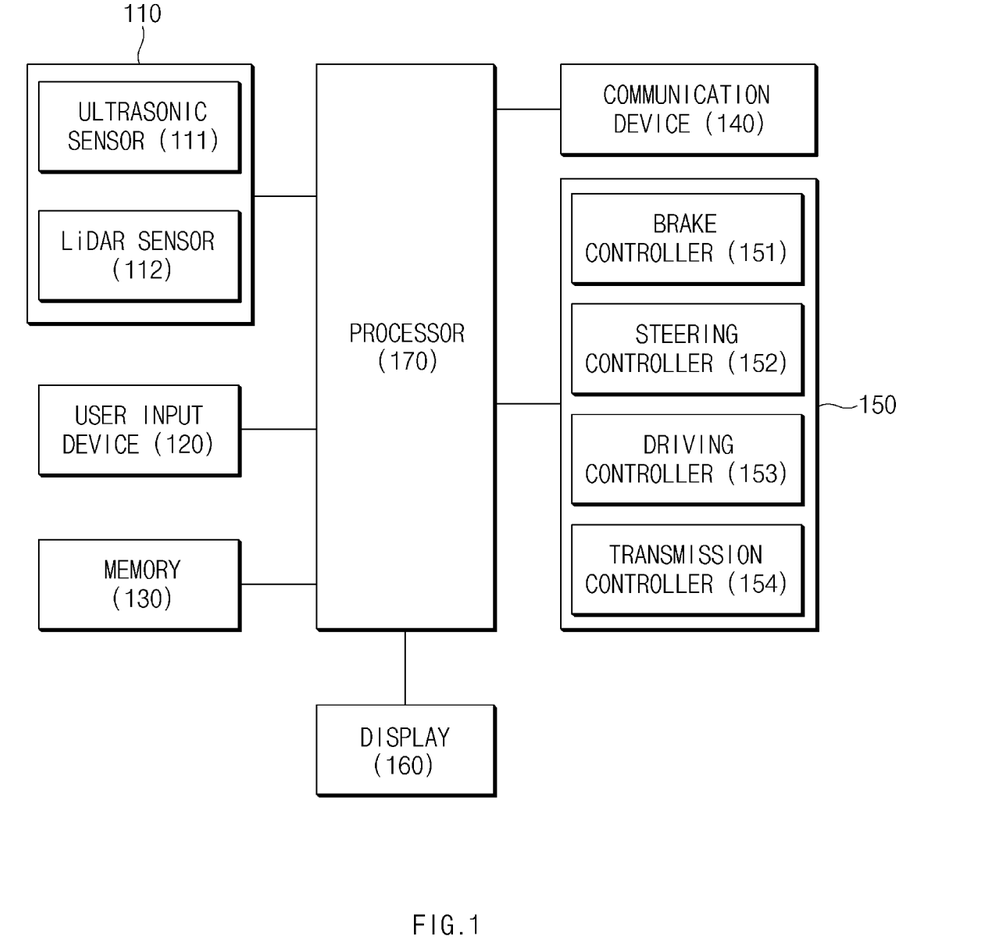
FIG. 1 is a block diagram illustrating an autonomous parking apparatus.

FIG. 1 is a block diagram illustrating an autonomous parking apparatus according to one form of the present disclosure.

Referring to FIG. 1, the autonomous parking apparatus includes a detector 110, a user input device 120, a memory 130, a communication device 140, a vehicle controller 150, a display 160, and a processor 170.

A detector 110 detects an object and a space around a vehicle. The detector 110 includes an ultrasonic sensor 111 and a light detection and ranging (LiDAR) sensor 112.

The ultrasonic sensor 111 generates ultrasonic waves and measures the distance between the vehicle and the object around the vehicle. The ultrasonic sensor 111 is used to search for an available parking space when the vehicle moves. The ultrasonic sensor 111 may be installed on the front side, rear side, and lateral sides of the vehicle.

The LiDAR sensor 112 obtains boundary information on the space around the vehicle on a point-by-point basis. The LiDAR sensor 112 sends out laser pulses, measures arrival time of the laser pulses reflected by the surrounding object, and calculates the spatial coordinates of the reflection points to determine the distance from the surrounding object and the shape thereof.

The detector 110 may include a radio detecting and ranging (RADAR) sensor (not illustrated). The RADAR sensor (not illustrated) measures the distance between the vehicle and the surrounding object. The RADAR sensor emits electromagnetic waves to the surroundings, receives the electromagnetic waves reflected by the surrounding object, and determines the distance from the surrounding object and the direction and altitude thereof.

The user input device 120 generates data according to a user operation. For example, the user input device 120 generates data for turning on/off an autonomous parking service (automatic valet parking service) function according to a user input. The user input device 120 may be implemented with a keyboard, a keypad, a button, a switch, a touch pad, and/or a touch screen.

The memory 130 may store software programmed to cause the processor 170 to perform predetermined operations and may store input/output data. The memory 130 may include an available parking space recognition algorithm, a parking path generation algorithm, and a parking control algorithm. Furthermore, the memory 130 may store information such as the width, length, height, and weight of the vehicle.

The memory 130 may be implemented with at least one storage medium (recording medium) among storage mediums such as a flash memory, a hard disk, a secure digital (SD) card, an random access memory (RAM), a static random access memory (SRAM), a read only memory (ROM), a programmable read only memory (PROM), an electrically erasable and programmable ROM (EEPROM), an erasable and programmable ROM (EPROM), a register, a detachable disk, and a web storage.

The communication device 140 performs wired/wireless communication with an electronic device inside or outside the vehicle. The communication device 140 may use a wireless Internet technology such as wireless LAN (WLAN) (WiFi), wireless broadband (Wibro), and/or world interoperability for microwave access (Wimax), a short range communication technology such as Bluetooth, near field communication (NFC), radio frequency identification (RFID), infrared data association (IrDA), ultra wideband (UWB), and/or Zigbee, a mobile communication technology such as code division multiple access (CDMA), global system for mobile communication (GSM), long term evolution (LTE), and/or LTE-Advanced, a wired Internet technology such as local area network (LAN), wide area network (WAN), Ethernet, and/or integrated services digital network (ISDN), and/or a serial communication technology such as universal serial bus (USB).

The vehicle controller 150 performs autonomous parking of the vehicle according to an instruction of the processor 170. The vehicle controller 150 includes a brake controller 151, a steering controller 152, a driving controller 153, and a transmission controller 154.

The brake controller 151 controls the speed of the vehicle and is implemented with electronic stability control (ESC).

The brake controller 151 controls a brake pressure according to the position of a brake pedal or under the control of the vehicle controller 150.

The steering controller 152 controls the vehicle's steering and is implemented with motor drive power steering (MDPS). The steering controller 152 controls the vehicle's steering angle under the control of the vehicle controller 150.

The driving controller 153 is an actuator for controlling the engine of the vehicle. The driving controller 153 controls acceleration of the vehicle. The driving controller 153 may be implemented with an engine management system (EMS). The driving controller 153 controls the driving torque of the engine according to acceleration pedal position information output from an acceleration pedal position sensor. The driving controller 153 controls the engine output to follow the driving speed of the vehicle requested by the vehicle controller 150 during autonomous parking.

The transmission controller 154 is an actuator for controlling the vehicle's transmission. The transmission controller 154 may be implemented with shift by wire (SBW). The transmission controller 154 controls the vehicle's transmission according to the gear position and the gear status range.

The display 160 displays a status and an outcome of processing according to an operation of the processor 170. The display 160 may include a sound output module, such as a speaker, which is capable of outputting audio data. For example, the display 160 may display an available parking space search result and may output a sound signal (an audio signal) through a speaker.

Furthermore, the display 160 may be implemented with a touch screen combined with a touch sensor and may be used as an input device as well as an output device. A touch film or a touch pad may be used as the touch sensor.

The display 160 may include one or more of a liquid crystal display (LCD), a thin film transistor-liquid crystal display (TFT LCD), an organic light-emitting diode (OLED) display, a flexible display, a three-dimensional (3D) display, a transparent display, a head-up display (HUD), a touch screen, and a cluster.

The processor 170 controls an overall operation of the autonomous parking apparatus. The processor 170 may include at least one of an application specific integrated circuit (ASIC), a digital signal processor (DSP), programmable logic devices (PLDs), field programmable gate arrays (FPGAs), a central processing unit (CPU), microcontrollers, and microprocessors.

The processor 170 activates an autonomous parking service when receiving a command to operate the autonomous parking service from the user input device 120 while the vehicle is stopped. For example, the processor 170 starts the autonomous parking service when a remote smart parking assist (RSPA) button included in the vehicle is input or an RSPA button included in a smart key is input.

The processor 170 detects a space around the vehicle through the detector 110. The processor 170 obtains point-based boundary information on the space around the vehicle through the LiDAR sensor 112. In other words, the processor 170 detects boundary points for the space around the vehicle using the LiDAR sensor 112. For example, the processor 170 detects the area (space) in front of the vehicle through the LiDAR sensor 112 installed on the front side of the vehicle.

The processor 170 generates a local map using spatial information on the space around the vehicle that is obtained through the detector 110. The processor 170 clusters the point-based boundary information (boundary points) into line-based boundary information (boundary lines) to generate local map data. That is, the processor 170 generates line segments by grouping boundary points on the same line together.

The processor 170 may calculate the distance between the vehicle and the boundary line of the space through the local map data. Furthermore, the processor 170 may determine an area (that is, a free space) that the vehicle is able to enter, through the local map data.

The processor 170 extracts an available parking space from the local map data. In other words, the processor 170 extracts the available parking space from the free space in the local map. Here, the available parking space refers to a space (area) in a vehicle elevator (carrier) of a mechanical parking system.

The processor 170 extracts break points, at each of which two boundary lines forming a predetermined angle intersect each other, from the local map data. Here, the predetermined angle may be set to a right angle.

The processor 170 extracts a first break point and a second break point, among the extracted break points, which are connected by a line segment and at which boundary lines are connected straight to opposite ends of the line segment, respectively. The processor 170 calculates the width of the available parking space using the distance between the first break point and the second break point. The processor 170 calculates the depth of the available parking space using the line segment connecting the first break point and the second break point and a boundary line parallel to the line segment. Based on the width and depth of the available parking space, the processor 170 determines whether the vehicle is able to enter the available parking space. In other words, the processor 170 compares the calculated width and depth of the available parking space with the width and length of the vehicle stored in the memory 130 and determines whether the vehicle is able to enter the available parking space. The processor 170 sets the available parking space as a destination according to a result obtained by determining whether the vehicle is able to enter the available parking space.

The processor 170 generates a parking path to the set destination, based on the local map data. The processor 170 controls the vehicle controller 150 according to the generated parking path to park the vehicle in the available parking space.

Furthermore, the processor 170 automatically releases the autonomous parking function when an impact above a critical impact level is detected when the vehicle enters the elevator. Here, the critical impact level is set to prevent the autonomous parking function from being automatically released due to an impact caused by external factors, such as a step, when the vehicle enters the elevator.

Figure 2:
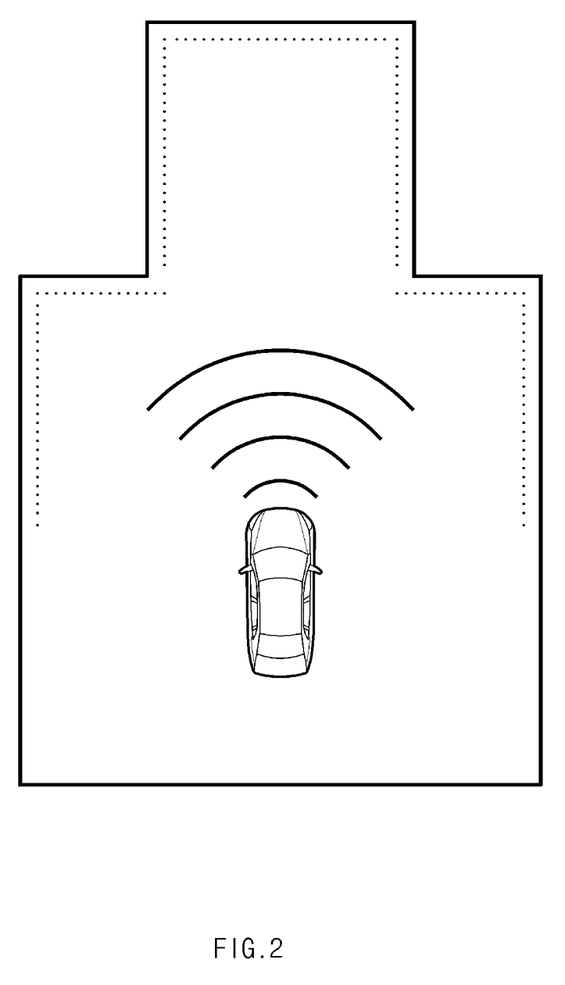
FIGS. 2 to 4 are views illustrating a method of searching for an available parking space.
Figure 3:
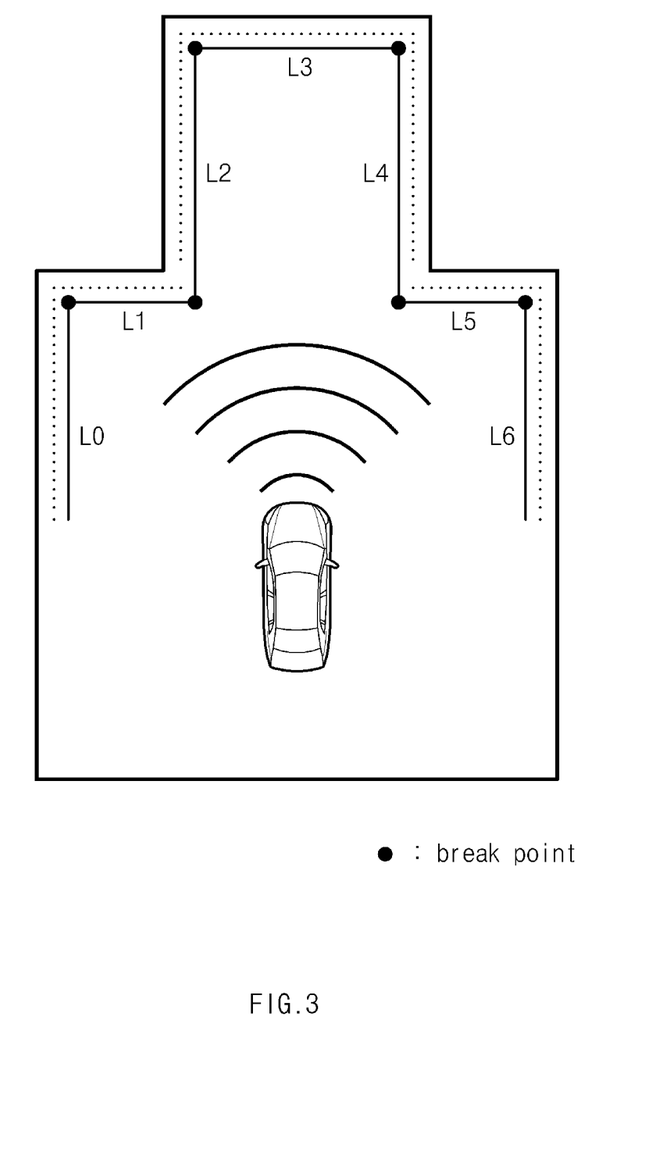
Figure 4:
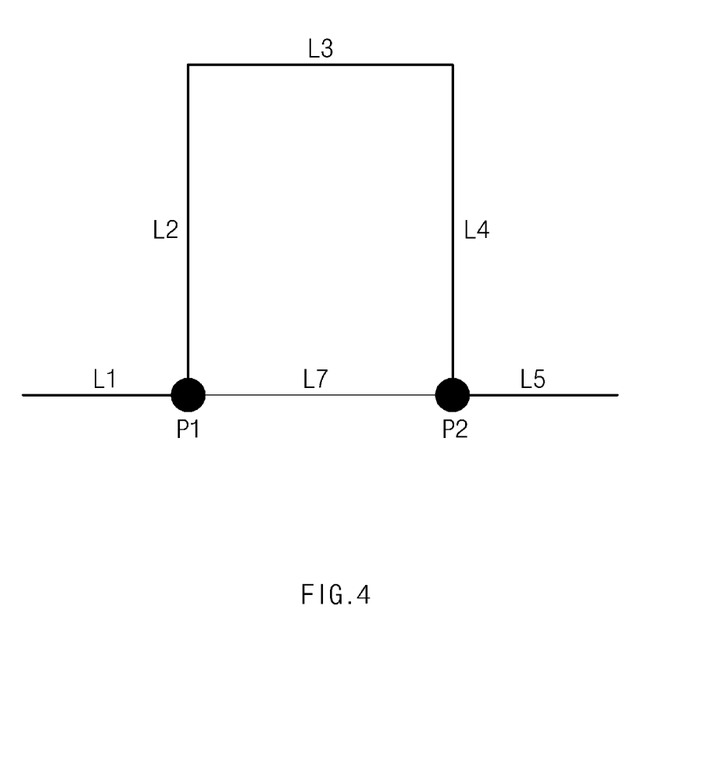

FIGS. 2 to 4 are views illustrating a method of searching for an available parking space according to exemplary forms of the present disclosure.

First, the processor 170 of the autonomous parking apparatus senses point-based boundary information on a space around a vehicle through the LiDAR sensor 112 after the vehicle stops. In other words, the processor 170, as illustrated in FIG. 2, detects boundary points of the space around the vehicle through the LiDAR sensor 112.

The processor 170 clusters the point-based boundary information sensed through the LiDAR sensor 112 into line-based boundary information to generate local map data. Referring to FIG. 3, the processor 170 divides the boundary points sensed by the LiDAR sensor 112 into groups to generate line segments, that is, boundary lines L0 to L6. The area bounded by the boundary lines L0 to L6 corresponds to a free space that the vehicle is able to enter.

The processor 170 extracts break points, at each of which two boundary lines forming a predetermined angle, among the boundary lines L0 to L6, intersect each other. For example, the processor 170 extracts break points, at each of which two boundary lines on the local map form a right angle.

The processor 170 extracts two break points, among the extracted break points, which are connected by a line segment and at which boundary lines are connected straight to opposite ends of the line segment, respectively. As illustrated in FIG. 4, the processor 170 extracts first and second break points P1 and P2 at which the boundary lines L1 and L5 are connected straight to opposite ends of a line segment L7 that connects the first and second break points P1 and P2. The processor 170 detects the space bounded by the line segment L7 that connects the first break point P1 and the second break point P2.

The processor 170 calculates the distance between the extracted first and second break points P1 and P2 and recognizes the width of the bounded space. The processor 170 calculates the distance between the line segment L7, which connects the first break point P1 and the second break point P2, and the boundary line L3, which is parallel to the line segment L7, and recognizes the depth of the bounded space.

The processor 170 compares the width and depth of the bounded space with the width and length of the vehicle stored in the memory 130 and determines whether the vehicle is able to enter the bounded space. When it is determined that the vehicle is able to enter the bounded space, the processor 170 detects the detected bounded space as an available parking space. Thereafter, the processor 170 sets the detected available parking space as a destination and generates a parking path for the entrance of the vehicle into the available parking space.

Figure 5:
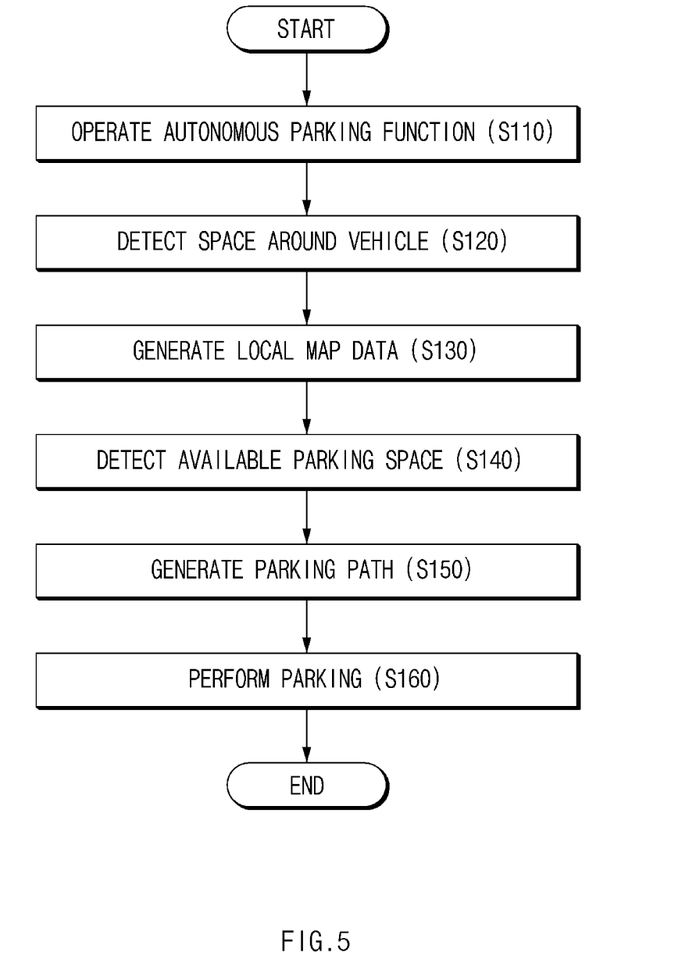
FIG. 5 is a flowchart illustrating an autonomous parking method.
Figure 6:
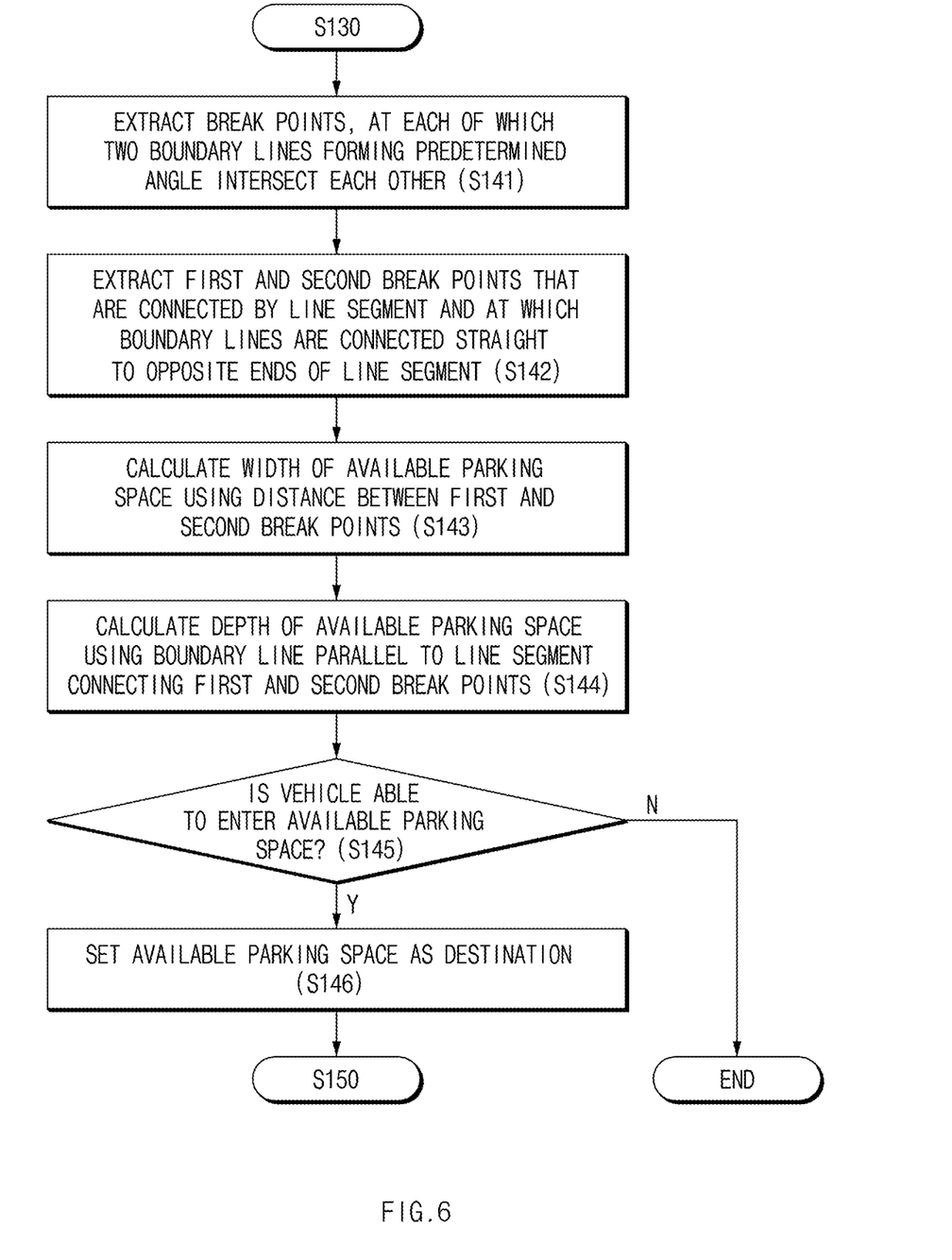
FIG. 6 is a flowchart illustrating the available parking space detection process illustrated in FIG. 5.

FIG. 5 is a flowchart illustrating an autonomous parking method according to one form of the present disclosure, and FIG. 6 is a flowchart illustrating the available parking space detection process illustrated in FIG. 5.

Referring to FIG. 5, the processor 170 of the autonomous parking apparatus operates an autonomous parking function when receiving, from the user input device 120, a command to turn on the autonomous parking function (Step S110). A user stops a vehicle in front of a door of a mechanical parking system or a vehicle lift and operates the user input device 120 or a smart key to enter a command to turn on the autonomous parking function when the door is opened. In this case, the door is opened when the user or a manager of the mechanical parking system or the vehicle lift calls an elevator (a carrier) and the elevator reaches a boarding entrance. Alternatively, when a parking infrastructure detects the vehicle in front of the door of the mechanical parking system or the vehicle lift, the parking infrastructure may automatically open the door, or the processor 170 of the autonomous parking apparatus may request the parking infrastructure through the communication device 140 to open the door.

When the autonomous parking function operates, the processor 170 detects a space around the vehicle through the detector 110 (Step S120). The processor 170 obtains point-based boundary information (boundary points) on the space around the vehicle through the LiDAR sensor 112 included in the detector 110.

The processor 170 generates local map data, based on information on the space around the vehicle that is obtained through the detector 110 (Step S130). The processor 170 clusters the point-based boundary information into line-based boundary information (boundary lines) to generate the local map data. In other words, the processor 170 generates the local map data by generating the boundary lines by grouping boundary points on the same line, among the boundary points sensed by the LiDAR sensor 112.

The processor 170 detects an available parking space, based on the local map data (Step S140). In other words, the processor 170 detects an available parking space for the vehicle in a free space on the local map.

The processor 170 extracts break points, at each of which two boundary lines forming a predetermined angle intersect each other, from the local map data (Step S141). For example, the processor 170 extracts two boundary lines forming a right angle, from the local map data and extracts one point at which the two extracted boundary lines intersect each other, as a break point.

The processor 170 extracts a first break point and a second break point, among the extracted break points, which are connected by a line segment and at which boundary lines are connected straight to opposite ends of the line segment, respectively (Step S142). When two break points are connected by a line segment and boundary lines are connected straight to opposite ends of the line segment (that is, the two break points), the processor 170 extracts the corresponding two break points. The processor 170 extracts the space bounded by the line segment that connects the two extracted break points.

The processor 170 calculates the width of the available parking space using the distance between the first break point and the second break point (Step S143). In other words, the processor 170 calculates the distance between the first break point and the second break point and recognizes the width of the bounded space (the available parking space).

The processor 170 calculates the depth of the available parking space using the line segment connecting the first break point and the second break point and a boundary line parallel to the line segment (Step S144). The processor 170 calculates the distance between the line segment connecting the first break point and the second break point and the boundary line parallel to the line segment and recognizes the depth of the bounded space (the available parking space).

Based on the width and depth of the available parking space, the processor 170 determines whether the vehicle is able to enter the available parking space (Step S145). The processor 170 compares the width and depth of the bounded space with the width and length of the vehicle stored in the memory 130 and determines whether the vehicle is able to enter the bounded space. For example, when the width and length of the vehicle are less than the width and depth of the bounded space, the processor 170 determines that the vehicle is able to enter the bounded space, and when at least one of the width and length of the vehicle is equal to or greater than the width and depth of the bounded space, the processor 170 determines that the vehicle is unable to enter the bounded space.

The processor 170 sets the available parking space as a destination when it is determined that the vehicle is able to enter the available parking space (Step S146). The processor 170 selects a bounded space that the vehicle is able to enter, among bounded spaces, as an available parking space. The processor 170 may set the selected available parking space as a destination. The processor 170 displays, on the display 160, the fact that the available parking space is set as the destination, and completes or releases the destination setting according to a user input through the user input device 120. In this case, the user may set another available parking space as a destination. Meanwhile, when it is determined that the vehicle is unable to enter the available parking space, the processor 170 outputs notification that the vehicle is unable to enter the available parking space and stops the autonomous parking function.

The processor 170 generates a parking path for parking the vehicle in the detected available parking space (Step S150). The processor 170 uses a known path generation algorithm to generate the parking path for parking the vehicle in the available parking space.

The processor 170 controls the vehicle controller 150 based on the generated parking path to perform autonomous parking (Step S160). The processor 170 parks the vehicle in the available parking space along the parking path. For example, the processor 170 performs parking by controlling the vehicle while the RSPA button is being input by the user.

According to the present disclosure, parking may be performed by generating a local map using information on a space around a vehicle that is obtained through a sensor mounted on the vehicle and detecting an available parking space that the vehicle is able to enter, based on the generated local map, whereby the vehicle may be maneuvered into an elevator (a carrier) of a mechanical parking system without a driver. Accordingly, driver convenience may be improved, and accidents in the mechanical parking system may be prevented.

Hereinabove, although the present disclosure has been described with reference to exemplary forms and the accompanying drawings, the present disclosure is not limited thereto, but may be variously modified and altered by those skilled in the art to which the present disclosure pertains without departing from the spirit and scope of the present disclosure. Therefore, the exemplary forms of the present disclosure are provided to explain the spirit and scope of the present disclosure, but not to limit them, so that the spirit and scope of the present disclosure is not limited by the forms. The scope of the present disclosure should be construed on the basis of the accompanying claims, and all the technical ideas within the scope equivalent to the claims should be included in the scope of the present disclosure.

What is claimed is:

1. An autonomous parking apparatus for a mechanical parking system, the autonomous parking apparatus comprising:
    a detector configured to detect a space around a vehicle; and
    a processor configured to:
        generate local map data based on spatial information obtained through the detector,
        determine an available parking space defined by line-based boundary information included in the local map data, and
        initiate an autonomous parking function of the vehicle to autonomously park the vehicle in the available parking space,
    wherein the available parking space includes a space in a vehicle elevator or a carrier of the mechanical parking system,
    wherein the processor is further configured to release the autonomous parking function when an impact above a critical impact level is detected while the vehicle enters into the available parking space using the autonomous parking function, and
    wherein the processor is further configured to extract break points, at each of which two boundary lines forming a predetermined angle intersect each other, from the line-based boundary information included in the local map data and configured to extract a first break point and a second break point, among the extracted break points, which are connected by a line segment and at which boundary lines are connected straight to opposite ends of the line segment, respectively.

2. The autonomous parking apparatus of claim 1, wherein the detector includes a light detection and ranging (LiDAR) sensor configured to detect boundary information of the space on a point-by-point basis.

3. The autonomous parking apparatus of claim 2, wherein the processor is configured to cluster point-based boundary information detected through the LiDAR sensor into the line-based boundary information and to generate the local map data.

4. The autonomous parking apparatus of claim 3, wherein the processor is configured to group boundary points on the same line, among boundary points of the space, and to generate boundary lines.

5. The autonomous parking apparatus of claim 1, wherein the processor is configured to extract a space bounded by the line segment, which connects the first break point and the second break point, from the local map data.

6. The autonomous parking apparatus of claim 5, wherein the processor is configured to calculate a distance between the first break point and the second break point and to recognize a width of the available parking space.

7. The autonomous parking apparatus of claim 6, wherein the processor is configured to calculate a distance between the line segment connecting the first break point and the second break point and a boundary line parallel to the line segment and configured to recognize a depth of the available parking space.

8. The autonomous parking apparatus of claim 7, wherein the processor is configured to determine whether the vehicle is able to be parked in the available parking space, based on the width and the depth of the available parking space.

9. The autonomous parking apparatus of claim 2, wherein the detector further includes at least one of an ultrasonic sensor or a radar sensor.

10. An autonomous parking method comprising:
    a step of detecting, by a detector, a space around a vehicle;
    a step of generating local map data, by a processor, based on the detected space around the vehicle;
    a step of determining, by the processor, an available parking space defined by line-based boundary information included in the local map data;
    a step of initiating an autonomous parking function of the vehicle to autonomously park the vehicle in the available parking space;
    a step of performing autonomous parking of the vehicle in the available parking space; and
    a step of releasing the autonomous parking function when an impact above a critical impact level is detected while the vehicle enters into the available parking space using the autonomous parking function,
    wherein the available parking space includes a space in a vehicle elevator or a carrier of a mechanical parking system,
    wherein the step of detecting the available parking space includes:
        a step of extracting break points, at each of which two boundary lines forming a predetermined angle intersect each other, from the line-based boundary information in the local map data;

a step of extracting a first break point and a second break point, among the extracted break points, which are connected by a line segment and at which boundary lines are connected straight to opposite ends of the line segment, respectively;

a step of recognizing a width and a depth of the available parking space, based on the first break point and the second break point;

a step of determining whether the vehicle is able to enter the available parking space, based on the width and the depth of the available parking space; and a step of setting the available parking space as a destination, based on a result obtained by determining whether the vehicle is able to enter the available parking space.

11. The autonomous parking method of claim 10, wherein the step of generating the local map data includes:

a step of detecting point-based boundary information on the space around the vehicle using a LiDAR sensor; and a step of generating the local map data by clustering the point-based boundary information into the line-based boundary information.

12. The autonomous parking method of claim 10, wherein the step of recognizing the width and the depth of the available parking space includes:

a step of calculating a distance between the first break point and the second break point to recognize the width of the available parking space; and a step of calculating a distance between the line segment connecting the first break point and the second break point and a boundary line parallel to the line segment to recognize the depth of the available parking space.

13. The autonomous parking method of claim 10, wherein the step of performing the autonomous parking includes:

a step of generating a path for parking the vehicle in the available parking space, based on the local map data; and a step of maneuvering the vehicle into the available parking space along the generated path.

* * * * *